UNITED STATES PATENT OFFICE.

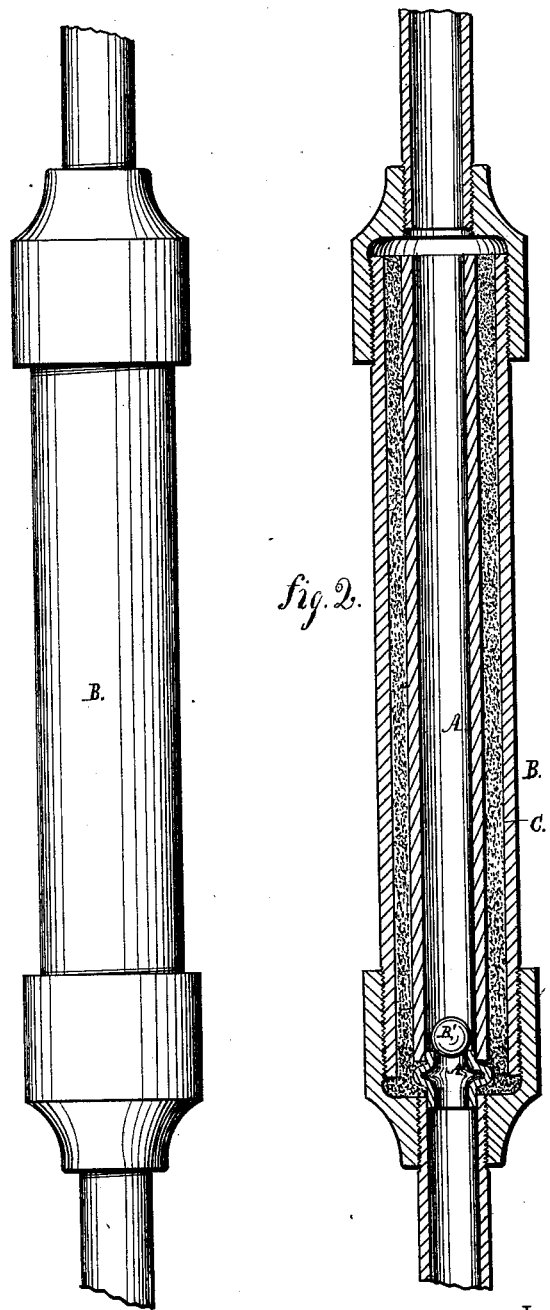

ROBERT F. MILFORD, OF PARKER CITY, PENNSYLVANIA.

IMPROVEMENT IN PUMPS FOR OIL-WELLS.

Specification forming part of Letters Patent No. 220,084, dated September 30, 1879; application filed January 11, 1879.

*To all whom it may concern:*

Be it known that I, ROBERT F. MILFORD, of Parker City, in the county of Armstrong, State of Pennsylvania, have invented a new and useful Improvement in Pumps for Oil-Wells; and I do hereby declare that the following is a full and exact description thereof, reference being had to the accompanying drawings, and to the letters of reference marked thereon.

My invention relates to an improvement in pumps for oil-wells; and consists in constructing the working-barrel, valves, and valve-seats of glass, and embedding the same in a metallic casing.

To enable others skilled in the art to make and use my invention, I will proceed to describe its construction and operation.

In the accompanying drawings, which form part of my specification, Figure 1 is a side elevation of my improvement in working-barrel and valve-chambers of an oil-pump. Fig. 2 is a vertical and longitudinal section of the same.

In the drawings, A represents the working-barrel, which is constructed of glass; B, the metallic casing, and C the packing between the outer wall of the working-barrel A and the inner wall of the casing B. The working-barrel A and the casing B are concentric to each other, and the space between the outer wall of the working-barrel A and the inner wall of the casing B is filled with plaster-of-paris or other suitable material.

The valve-seats A' and valves B', are constructed of glass, and are of the usual form and connected to the working-barrel of the pump in the usual manner.

A working-barrel, valve, and valve-seats constructed of glass, as hereinbefore described, will be less liable to wear, and not so liable to become inoperative, from the fact that sand, paraffine, and other adhesive matter in the oil will not adhere to them, it being an ascertained fact that hydrocarbon oil, when in motion, will wash the surfaces of glass, so that none of the adhesive matter in the oil will adhere to the valve, valve-seat, and working-barrel when said parts are constructed of glass.

The casing B of the working-barrel hereinbefore described is attached to the pump-tubing in the usual way and by the ordinary means.

Having thus described my improvement, what I claim as of my invention is—

1. In a pump for oil-wells, a glass working-barrel, A, a glass valve-seat, A', at its lower extremity, and a glass valve, B', the said glass valve-seat and glass working-barrel being surrounded by a non-metallic protecting material and a casing around said material, substantially as herein shown and specified.

2. In a pump for oil-wells, a glass working-barrel, A, a glass valve-seat, A', and a glass valve, B', the said glass valve-seat and glass working-barrel being surrounded and protected by plaster-of-paris, or equivalent protective substance, and the said protective material being surrounded by the casing B, substantially as specified, and for the purposes set forth.

ROBERT F. MILFORD.

Witnesses:
JOSEPH AVERY,
WALLACE MARTIN.